(12) United States Patent
Martin et al.

(10) Patent No.: US 8,440,370 B2
(45) Date of Patent: *May 14, 2013

(54) METHOD OF MAKING A REFLECTION HOLOGRAM AND A REFLECTION HOLOGRAM

(75) Inventors: Suzanne Martin, Blanchardstown Dublin (IE); Izabela Naydenova, Roebuck Road (IE); Vincent Toal, Balbriggan (IE)

(73) Assignee: Dublin Institute of Technology (IE)

( * ) Notice: Subject to any disclaimer, the term of this patent is extended or adjusted under 35 U.S.C. 154(b) by 262 days.

This patent is subject to a terminal disclaimer.

(21) Appl. No.: 12/452,365

(22) PCT Filed: Jun. 30, 2008

(86) PCT No.: PCT/EP2008/058408
§ 371 (c)(1),
(2), (4) Date: Feb. 10, 2010

(87) PCT Pub. No.: WO2009/000936
PCT Pub. Date: Dec. 31, 2008

(65) Prior Publication Data
US 2010/0167179 A1    Jul. 1, 2010

Related U.S. Application Data

(60) Provisional application No. 60/937,589, filed on Jun. 28, 2007.

(51) Int. Cl.
*G03H 1/02*    (2006.01)

(52) U.S. Cl.
USPC .......................... 430/1; 430/2; 359/3

(58) Field of Classification Search .................. None
See application file for complete search history.

(56) References Cited

U.S. PATENT DOCUMENTS

| 2,241,402 | A | * | 5/1941 | Hesser | 430/257 |
| 3,519,519 | A | * | 7/1970 | Basso | 156/430 |
| 3,963,490 | A | * | 6/1976 | Graube | 430/1 |
| 4,477,557 | A | * | 10/1984 | Rauch | 430/308 |

(Continued)

FOREIGN PATENT DOCUMENTS

| GB | 2 439 746 | 1/2008 |
| JP | 56-125735 | * 10/1981 |

(Continued)

OTHER PUBLICATIONS

Pavani K. et al; Photoinduced Surface Relief Studies in an Acrylamide-Based Photopolymer; Journal of Optics A: Pure and Applied Optics; Institute of Physics Publishing; Bristol, GB; vol. 9, No. 1; Jan. 1, 2007; pp. 43-48; XP020123257; ISSN: 1464-4258.

(Continued)

*Primary Examiner* — Martin Angebranndt
(74) *Attorney, Agent, or Firm* — Carmen Patti Law Group, LLC

(57) ABSTRACT

The present application provides a method of manufacturing a reflection hologram. The method comprises the steps of placing a first pattern of activating material upon a layer of inactive holographic recording material to selectively activate the layer and exposing the layer to holographic recording process for producing a reflection hologram.

11 Claims, 4 Drawing Sheets

U.S. PATENT DOCUMENTS

| | | | | |
|---|---|---|---|---|
| 4,842,968 A | * | 6/1989 | Kojima et al. | 430/1 |
| 5,118,656 A | * | 6/1992 | Minami et al. | 503/209 |
| 5,182,180 A | * | 1/1993 | Gambogi et al. | 430/1 |
| 5,526,145 A | * | 6/1996 | Weber | 359/15 |
| 5,725,970 A | * | 3/1998 | Martin et al. | 430/2 |
| 6,127,066 A | * | 10/2000 | Ueda et al. | 430/1 |
| 2003/0207256 A1 | | 11/2003 | Sayre et al. | |
| 2009/0246642 A1 | * | 10/2009 | Martin et al. | 430/2 |

FOREIGN PATENT DOCUMENTS

| | | | |
|---|---|---|---|
| JP | 06-332355 | * | 12/1994 |
| JP | 06-332356 | * | 12/1994 |
| WO | WO 2005/078533 | | 8/2005 |

OTHER PUBLICATIONS

Hosam Sherif et al; Characterization of an Acrylamide-Based Photopolymer for Data Storage Utilizing Holographic Angular Multiplexing; Acrylamide-based Photopolymer for use in Holographic Data Storage; Journal of Optics A: A Pure and Applied Optics; Institute of Physics Publishing; Bristol, GB; vol. 7, No. 5, May 1, 2005; pp. 255-260; XP020093097.

* cited by examiner

US 8,440,370 B2

METHOD OF MAKING A REFLECTION HOLOGRAM AND A REFLECTION HOLOGRAM

CROSS-REFERENCE TO RELATED APPLICATIONS

This application claims the benefit of PCT International Application Number PCT/EP2008/058408, filed Jun. 30, 2008 which claims the benefit of Provisional Application 60/937,589 filed Jun. 28, 2007.

FIELD OF THE APPLICATION

The present application relates generally to the field of holography. More particularly, the present application relates to a method for the selective formation of reflection holograms.

BACKGROUND OF THE APPLICATION

Holography is well known and widely used in many commercial applications including display holography, security, advertising, data storage and holographic optical elements and gratings. A holographic image is produced when reconstructing light is diffracted at a complex diffraction grating of spatially varying spatial frequency, which, in the simplest terms, re-directs the light towards the viewer in such a way as to give the illusion that the light is coming from a three-dimensional object.

Depending on the geometry of the recording system, there can be two types of holograms, i.e. transmission and reflection. The orientation of the fringes in the two types is fundamentally different as are their methods of manufacture and their effects on the reconstructing light, particularly white light. The present application is directed to reflection holograms.

SUMMARY

In contrast to the prior art, the present invention provides a method of defining a reflection hologram comprising selective activation of areas of a recording medium in which a reflection hologram is to be recorded.

According to the invention there is provided a method of manufacturing a reflection hologram comprising the steps of: placing a first pattern of activating material upon a layer of inactive holographic recording material to selectively activate the layer and exposing the layer to a reflection holographic recording process.

In one embodiment, the layer of inactive holographic recording material is provided in dry sheet or in liquid form.

In another embodiment, the activating material is provided in liquid form.

In a further embodiment, the activating material is provided in dry form.

In one embodiment, the inactive holographic recording material comprises two of the following: a monomer, free radical generator, a dye.

In another embodiment, the activating material comprises one of the following:
a monomer, free radical generator, a dye,
which is not present in the inactive holographic recording material.

In a further embodiment, the inactive holographic recording material comprises a free radical generator and at least one monomer.

In one embodiment, the activating material comprises a dye.

In another embodiment, the reflection holographic recording process is configured to produce a second pattern comprising interference fringes in the holographic recording material and the reflection hologram produced is a combination of this second pattern and that defined by the first pattern of activating material.

In a further embodiment, the reflection hologram is produced by the interference of two recording beams which are incident from opposite sides of the holographic recording material.

In one embodiment, the interference fringes are substantially parallel to the plane of the substrate.

In another embodiment, the activating material is placed on the layer of holographic recording material by a printing method.

In a further embodiment, the activating material is placed on the holographic recording material by an indirect method such as contact with a printed sheet containing a pattern of activating substances.

In one embodiment, the activating material is placed on the holographic recording material manually or using a paintbrush, pen, sponge or other suitable writing or printing apparatus.

In another embodiment, the activating material is provided by the provision of another molecule or species to which the activating material is bound.

In a further embodiment, the activating material is placed on the holographic recording material using a combination of the above methods.

In one embodiment, more than one reflection hologram is multiplexed in the holographic recording material.

According to another aspect the invention provides a reflection hologram as manufactured by the methods of the invention.

According to a further aspect the invention provides a patterned reflection hologram defined in a layer of holographic recording material wherein the pattern is at least partially defined by a pattern of activating material diffused into the inactive holographic recording material.

In one embodiment, the pattern is further defined by the method and process of recording the hologram.

In another embodiment, the characteristics of the hologram, for example, thickness, and/or angular selectivity, and/or diffraction efficiency, depend on the diffusion characteristics of the activating material through the photopolymer layer and/or time elapsed, and/or local or ambient temperature and/or humidity, and/or pressure, and/or diffusion characteristics through a membrane or barrier, and/or or environmental conditions.

In a further embodiment, the characteristics of the hologram for example, thickness, and/or angular selectivity, and/or diffraction efficiency depend on the diffusion characteristics of the molecule or species to which the activating material is bound through the photopolymer layer, and/or time elapsed, and/or local or ambient temperature and/or humidity, and/or pressure, and/or diffusion characteristics through a membrane or barrier, and/or or environmental conditions.

DETAILED DESCRIPTION OF DRAWINGS

Figure 1:
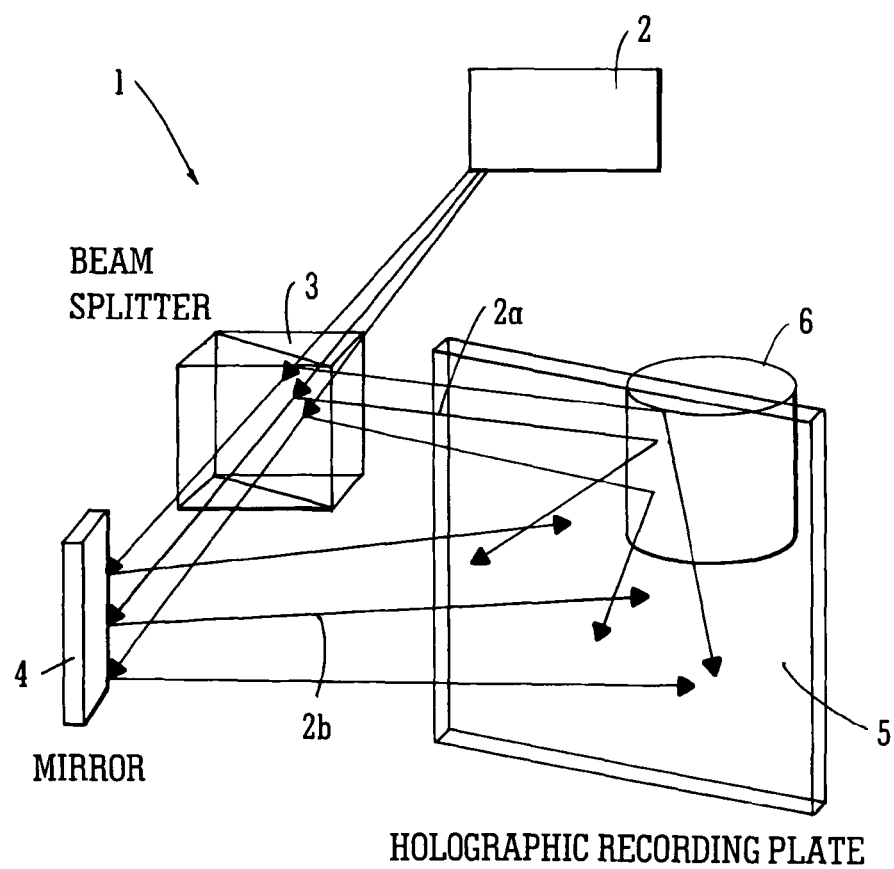
FIG. 1 represents an optical set-up for recording a reflection hologram on a holographic recording medium as might be employed with this application.

The present application will now be described exemplarily with reference to a holographic recording process employing photopolymers. The method may also be applied to other holographic recording materials.

In order to record a hologram a light pattern is produced by the interference of two or more beams of mutually coherent light normally produced by a laser light source. This interference pattern which contains all the information necessary to reconstruct the original object wave must then be recorded by a suitable photosensitive material. In a conventional photopolymer recording process this would be a photosensitive layer or medium containing a photosensitive dye.

In order to record a reflection hologram, two of the interfering beams must come from opposite sides of the photosensitive layer so that the recorded interference fringes lie substantially parallel with the plane of the substrate. When these are recorded by the photosensitive medium they form layers of higher and lower refractive index which diffract the reconstructing light back towards the viewer, This is in contrast to a transmission hologram in which normally the layers of high and low refractive index (and the interference fringes that created them) are substantially perpendicular to the plane of the substrate.

The high wavelength selectivity of the reflection hologram allows one or more monochromatic images to be obtained in reconstruction in white light. Transmission holograms need to be viewed from the opposite side of the hologram from the light source, and are difficult to see in white light because of the multiple images of different colours produced alongside each other. Transmission holograms are usually reconstructed only in laser light.

In order to be able to record reflection holograms, a material must have certain characteristics, as follows:
1. High resolution: The inter-fringe spacing in the interference pattern during the recording of a reflection hologram is typically 2 to 3 times smaller than the inter-fringe spacing in a transmission hologram recorded at the same wavelength. For this reason the resolution capabilities must be higher and the material must be capable of producing significant diffraction efficiency at >4000 lines/mm for typical visible wavelength holograms. (Typically 1000-2000 lines/mm is sufficient for transmission holograms.)
2. Dimensional stability. Any shrinkage or swelling of the material is much more of a problem in reflection than in transmission holography. Because the fringes are largely parallel to the substrate, any bulk shrinkage or swelling of the material (which tends to be in a direction perpendicular to the substrate) will change the inter-fringe spacing. If a dimensional change occurs after recording (in many materials this occurs as a result of material being removed or added during development) the colour of the reconstructed holographic image will be affected. If dimensional change occurs during recording, the fringes will move relative to the interference pattern and it is unlikely that a strong hologram (i.e. one with high diffraction efficiency in reconstruction) will result.
3. High transparency: Reflection holography can be problematic if there is too much absorption of light in the photosensitive layer. This is because the interfering beams meet each other from opposite sides of the recording medium and the beam ratio, even for two perfectly equalized beams, will only ever be the optimal value of 1 midway through the depth of the material. If the absorption is too high the local beam ratio, and therefore the local fringe contrast, will deviate greatly from 1 at the front and back edges and leading to low interference fringe contrast and a poor holographic recording. This problem is more easily tolerated in transmission holography where both beams are incident on the recording medium from the same side. In that case even though the intensities of the beams may diminish, as they pass through the layer, the beam ratio is likely to be constant throughout the photosensitive layer.

The photopolymer formulation recently described in WO2007060648 and herein incorporated by reference, is highly suitable for reflection holography. The resolution is excellent, 30% diffraction efficiency routinely achievable at >4,500 lines/mm. Shrinkage is low enough and slow enough for good reflection holography and, with the addition of nanoparticles, it can be reduced further (I. Naydenova, H. Sherif, S. Mintova, S. Martin, V. Toal, "Holographic recording in nanoparticle-doped photopolymer", SPIE proceedings of the International Conference on Holography, Optical Recording and Processing of Information, V 6252, 45-50, 2006). Transmission is greater than 80% through a typical 30 micron thick layer. In applications where sensitivity to the environment may not be desirable, it may be reduced by a number of methods including the use of thicker layers, sealed or coated layers, or treatment of recorded holograms with heat.

The photosensitive layer typically comprises a number of individual components including: a dye, a free radical generator, a monomer and, optionally, a binder. Although, it will be appreciated that there may be more than one type of each component, e.g. several different monomers or several different dyes may be employed in the photosensitive material. The role and nature of these materials and the process by which they combine to record a hologram will now be discussed briefly. Although, it will be appreciated that these techniques would be well known and understood by those skilled in the art.

The role of the photosensitive dye in the photosensitive layer is to absorb light and start the photochemical processes that lead to holographic recording. Examples of photosensitive dye would include erythrosine B, fluorescein and other xanthene dyes.

In bright regions of the produced interference pattern, the energy from photons of light raises the dye molecules to excited singlet states. Many of the singlet state excited molecules are then converted to triplet state excited molecules by intersystem crossing. In the triplet state, a dye molecule can interact with a free radical generator, for example, triethanolamine. This interaction produces an active free radical. The active free radical can, in turn, interact with a monomer molecule such as acrylamide creating a monomer radical. The creation of the monomer radical, results in free radical chain polymerization occurring in the polymer material.

Conversion of the carbon-carbon double bond to a single bond changes the molecular polarizability of the acrylamide and thus its refractive index. In addition, the depletion of monomer concentration in illuminated regions results in a spatial gradient of monomer concentration inducing diffusion of monomer from dark to bright regions. At an early stage of recording short polymer chains diffusion from bright to dark regions can also take place. These diffusion processes also contribute to a local change in refractive index. By these mechanisms, the spatial variation in light intensity is recorded as a refractive index variation in the photopolymer layer, i.e. a hologram is produced.

The dye, free radical generator and monomer may all be considered as essential components of the photosensitive material or, more generally, essential for the process of recording a hologram, since, if any of these components are absent, photopolymerisation cannot take place. This characteristic may be employed in selective activation/patterning or sensing/detection processes.

In the method and process of the present invention the components of the photopolymer layer are separated to provide an inactive photopolymer layer from which one of the essential components is absent and employs the subsequent addition of that essential component, referred to as the activating material, to allow the recording process for a reflection hologram to be activated.

The activating material may further be provided in liquid form or dry form. The activating material may be provided by physical deposition onto the inactive photopolymer layer by a suitable method, including for example, a printing method or a writing method, manually or using a paintbrush, pen, sponge or other suitable writing or printing apparatus. A suitable printing apparatus may for example comprise a bubble jet or inkjet printer. The activating material may also be provided by the introduction or provision of a further species or molecule or molecules to which the activating material is bound, to the inactive photopolymer layer, this latter species may diffuse into the inactive photopolymer layer. The presence or pattern of the activating material is dependent on the presence of the further species (or molecule or molecules).

The key to the photopolymer holographic recording process is that one free radical initiates a chain reaction which will polymerize many monomer molecules. Thus there is an amplification process which allows one dye molecule to facilitate the polymerization of many monomer molecules. This makes the dye a particularly suitable candidate as the activating material. The electron donor may also be used as the activating material because it is essential to the initiation process. The monomers may also be used as the activating material, however this would be at the expense of the amplification process. In applications where sensitivity is not a key issue this approach may be useful, especially in situations where diffusion of the activating material is important, since the monomers are the smallest active components.

Referring to WO2007060648 a method of preparation of an exemplary photopolymer layer suitable for use in a reflection hologram recording process is described. In the case of the present invention an inactive photopolymer recording layer is prepared following some or all of the steps described, however, the sensitizer/(s) are not added so that the photopolymer layer is inactive.

A photopolymer holographic recording material which has been developed at the Centre for Industrial and Engineering Optics, Dublin Institute of Technology, may be provided as a layer of material, possibly on a solid substrate such as a glass slide, with the exception that the dye is omitted from the formulation of the holographic recording material. The omission of the dye from the formulation renders the layer inactive i.e. substantially incapable of responding to light. Efforts to record a reflection hologram by exposure to an interference pattern will not be successful unless dye is introduced.

In greater detail, the inactive holographic recording medium suitably comprises a photopolymer layer composition comprising the following: a binder, which acts as a support medium or host matrix for monomers and a free radical generator.

In more detail, the structure of an exemplary holographic recording medium, which has been found to provide good results, includes the following:

Monomer:

An exemplary monomer used in the photopolymer composition is acrylamide. The structure of the acrylamide molecule is shown below. The molecules contain a carbon-carbon double bond (C=C). This double bond is broken on polymerization resulting in two single bonds. In particular, electrophoresis grade acrylamide powder (for example, as available from Sigma Aldrich of St Louis, Mo., USA) may be used.

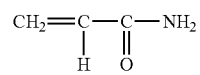

Binder:

A suitable binder used in the photopolymer layer is polyvinyl alcohol (PVA) (for example from Sigma Aldrich or Riedel De Haen). The chemical formula for pure polyvinyl alcohol (100% hydrolyzed) binder is shown below.

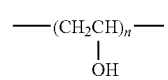

A low percentage hydrolysis binder may also be used. The chemical formula of an alternative lower percentage hydrolyzed polyvinyl alcohol in which a second polymer (generally polyvinyl acetate, from which the polyvinyl alcohol is synthesized) is present, is as follows

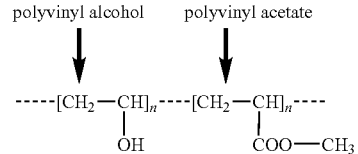

Crosslinking Monomer:

A second monomer employed in the exemplary photopolymer layer composition acts as a crosslinking monomer, for example NN'methylenebisacrylamide (available from Sigma Aldrich). The structure of the molecule is shown below. It is a symmetric molecule of two acrylamide molecules attached with a methyl group in the middle.

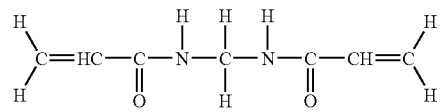

Free Radical Generator:

An exemplary free radical generator comprises Triethanolamine (TEA) (available from Sigma Aldrich chemicals). As explained above, the free radical generator plays a significant role in the generation of free radicals to initiate a polymerization reaction. The chemical formula of TEA is shown below.

If, however, the dye, the electron donor, or the monomer is absent from the photopolymer layer then photopolymerisation cannot take place. No hologram will result even if an appropriate interference pattern is incident on the layer.

Only when the activating material i.e. a dye (or monomer or catalyst) is subsequently introduced to the photopolymer layer containing all the other components does photopolymerisation become possible.

There are many variations in concentration and volume of the above described formulation, which also work well. For example, where more brightness is required in the final holographic image more acrylamide can be used and where lower angular selectivity is an advantage, thinner layers are prepared. Much thicker samples and larger area samples may also be prepared. Samples may also be prepared in any desired shape by moulding.

It will be appreciated that alternative monomers, free radical generators and binders may be employed depending on the particular requirements of the application. Similarly, additional components, for example, nanoparticles may be added for improved performance.

Referring to FIG. 1 a set-up 1, for generating a reflection hologram, is shown which comprises a laser 2, the light from which is split into two beams 2a and 2b (in this case via a beamsplitter 3 and mirror 4 arrangement) which are incident on the photosensitive medium 5 from opposite sides so that the interference pattern will cause planes of high and low refractive index within the photopolymer, substantially parallel to the plane of the substrate.

If the object is replaced with another mirror a simple reflection holographic grating would be produced. If, one of the beams is made to reflect from an object 6, for example as shown in FIG. 1 before falling on the photosensitive medium, the interference pattern recorded will contain phase information about the object 6. When the hologram is later illuminated by a reference beam, a holographic image of that object will be reconstructed by diffraction of the incident light in the hologram. As the hologram is, in this case, a reflection hologram, that image can be seen under white light illumination because the fringe spacing will reconstruct only the wavelength that matches the fringe spacing, giving a monochromatic image of the original object. The object may be a solid object, a transparency, text, another hologram, an arrangement of mirrors, or any other method of manipulation of the intensity, or phase or wavelength of the incident beams 2a and 2b to create a desired effect in the final holographic image. Reflection holograms may also be multiplexed so that different images/logos/text/numerics are seen from different angles.

Figure 2:
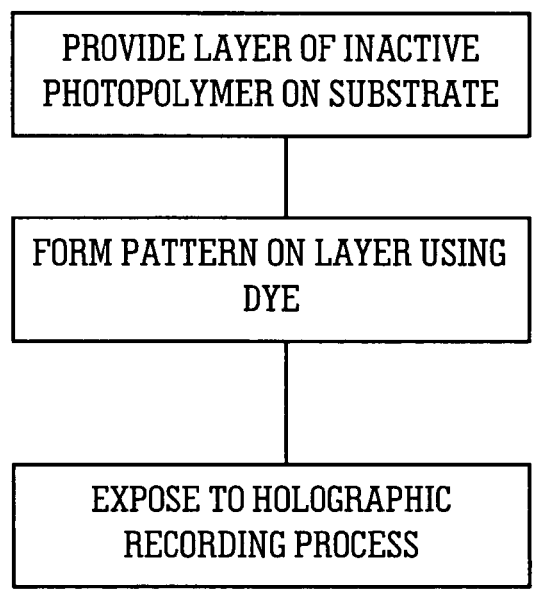
FIG. 2 is an exemplary process flow according to an embodiment of this application.
Figure 3:
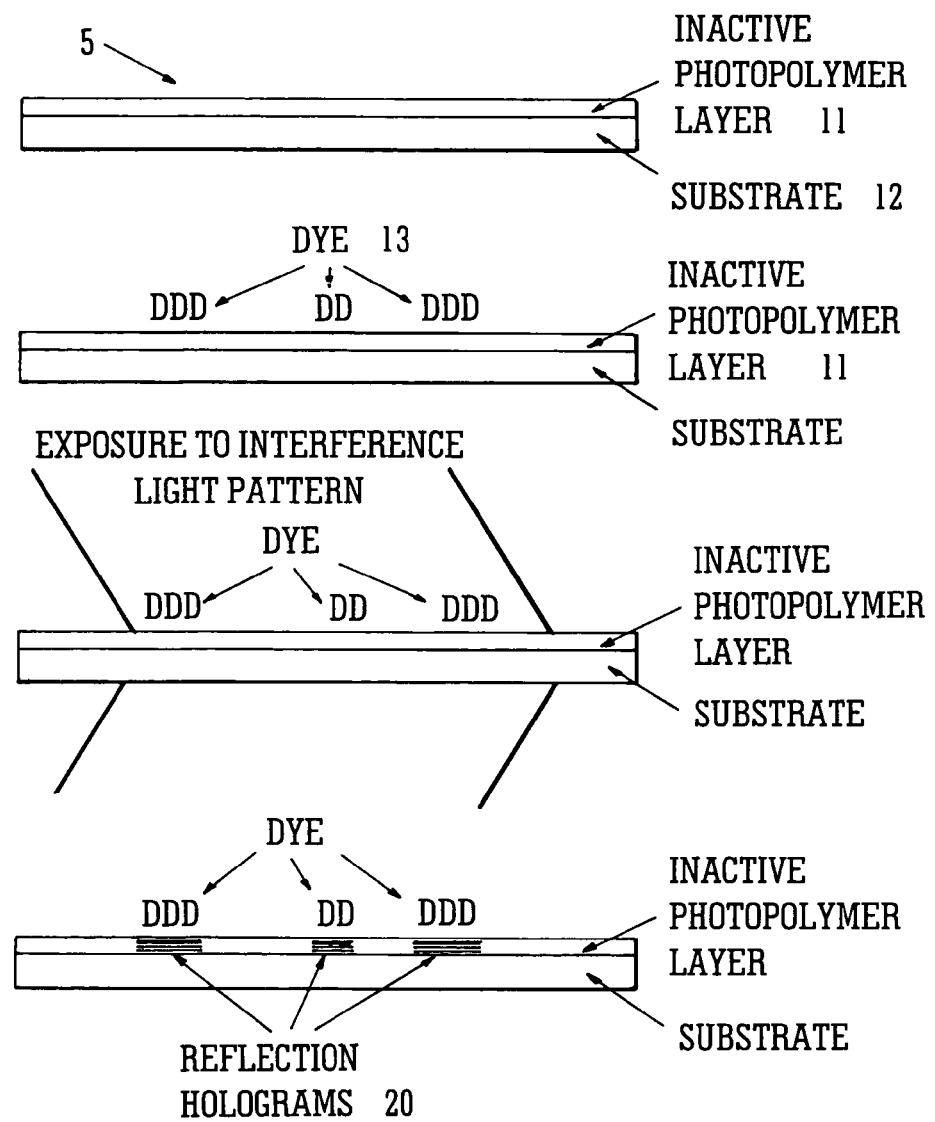
FIG. 3 represents the results of each of the steps of the process flow of FIG. 2.

Referring FIGS. 2 and 3, the steps of an exemplary method according to the invention are described. An inactive layer of holographic recording material 5 comprising a photopolymer layer 11 on a glass substrate 12 is provided. In this case the dye 13 has been omitted from the photopolymer layer 11 and as a result the photopolymer layer 11 is inactive to a holographic recording process. The dye 13 is applied in a first pattern to the inactive photopolymer layer 11. The dye 13 is the activating material, the presence of which selectively activates those areas of the photopolymer layer 11 where the dye 13 has been applied. The inactive holographic recording material 5 may be provided in dry sheet form. The activating material, in this case the dye, may be provided in liquid form or dry form.

Figure 4:
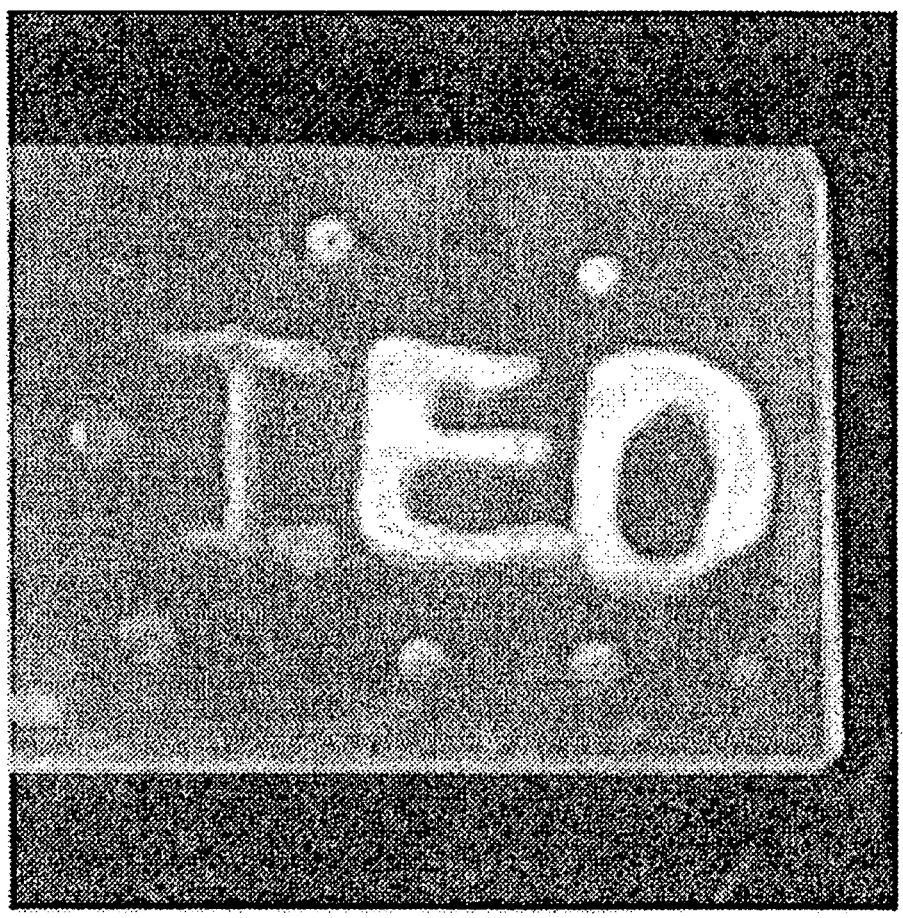
FIG. 4 illustrates an exemplary reflection hologram as produced by the process flow of FIG. 2.

An example of a reflection hologram produced by the present method is shown in the photograph of FIG. 4. In this example, dDye was deposited on a photopolymer layer in a pattern of letters (IEO) and small peripheral circular spots and a reflection holographic grating was then recorded by the Denisyuk method. When the grating is illuminated by white light, it is cleary visible that a holographically reconstructed light beam is diffracted only from those areas where dye was deposited.

It will be appreciated that the presence or absence of a hologram may be employed as a sensor whereby the absence of a hologram indicates the absence of the activating material. Where the activating material is employed as a label for a particular substance, the absence of a formed hologram indicates the absence of the particular substance and similarly the presence of a hologram indicates the presence of a particular substance.

While in the above exemplary embodiment the inactive recording material is provided in sheet or dry sheet form and the activating material may be provided in liquid or dry form, it will be appreciated that in an alternative arrangement the inactive holographic recording material may be provided in liquid form to be deposited on the activating material.

When the activating material has been applied to the photopolymer layer, a reflection hologram 20 may then be recorded by exposing the photopolymer layer to a reflection holographic recording process.

The reflection holographic recording process is configured to produce a second pattern, an interference fringe pattern, in the holographic recording material and the actual reflection hologram produced is a combination of this pattern and that defined by the first pattern of activating material.

It will be appreciated that the characteristics of a patterned reflection hologram according to the invention for example, thickness, and/or angular selectivity, and/or diffraction efficiency will depend on the diffusion characteristics of the activating material (or the diffusion characteristics of the molecule(s) to which the activating material may be bound) through the photopolymer layer, and/or time elapsed, and/or local or ambient temperature and/or humidity, and/or pressure, and/or diffusion characteristics through a membrane or barrier, and/or or environmental conditions.

The words comprises/comprising when used in this specification are to specify the presence of stated features, integers, steps or components but does not preclude the presence or addition of one or more other features, integers, steps, components or groups thereof.

The invention claimed is:

1. A method of manufacturing a reflection hologram comprising of the steps of:
   providing a layer of photopolymer material comprising a binder and at least one monomer where the photopolymer layer does not comprise a dye;
   printing a pattern of activating material comprising a dye upon the layer of photopolymer material to provide patterned regions where dye is present and regions where no dye is present so as to selectively activate the patterned regions of the layer of photopolymer material to be sensitive to light of a holographic recording process; and
   exposing the layer to a holographic recording process to record a hologram only in the activated patterned regions of the photopolymer layer, where the photopolymer layer outside the activated patterned regions is insensitive to the light of the holographic recording process as there is no dye outside the activated patterned regions.

2. A method according to claim 1, wherein the activating material is provided in liquid form.

3. A method according to claim 1, wherein the layer of photopolymer material comprises a free radical generator.

4. A method according to claim 1, wherein the reflection holographic recording process is configured to produce an interference fringe pattern and the reflection hologram produced is this interference fringe pattern limited to the patterned regions of the photopolymer layer.

5. A method according to claim 1, wherein the reflection hologram is produced by the interference of two recording beams which are incident from opposite sides of the photopolymer layer.

6. A method according to claim 4, wherein the interference fringes are substantially parallel to the plane of the substrate.

7. A method according to claim 1, wherein the activating material is placed on the holographic recording material manually or using a paintbrush, pen, sponge or other suitable printing apparatus.

8. A method according to claim 1, wherein the activating material is provided by the provision of another molecule or species to which the activating material is bound.

9. A method according to claim 1, wherein more than one reflection hologram is multiplexed in the holographic recording material.

10. A method according to claim 1, wherein the activating material is employed to label a particular chemical, biological or environmental analyte, and the production of the reflection hologram constitutes in and of itself a detection process for the analyte.

11. A patterned reflection hologram as manufactured by a method comprising the steps of:
   providing a layer of photopolymer material comprising a binder and at least one monomer where the photopolymer layer does not initially comprise a dye;
   printing a pattern of activating material comprising a dye upon the layer of photopolymer material to selectively activate the patterned regions of the layer of photopolymer material to be sensitive to light of a holographic recording process; and
   exposing the layer to a holographic recording process so that a hologram is formed where the photopolymer layer was printed with the activating material and there is no hologram formed in other regions of the photopolymer layer as there is no dye present outside the patterned regions.

* * * * *